United States Patent
Sugimoto et al.

(10) Patent No.: US 8,597,561 B2
(45) Date of Patent: Dec. 3, 2013

(54) METHOD FOR PRODUCING PNEUMATIC TIRE

(75) Inventors: Mutsuki Sugimoto, Kobe (JP); Keiichi Nakadera, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 492 days.

(21) Appl. No.: 12/873,696

(22) Filed: Sep. 1, 2010

(65) Prior Publication Data

US 2011/0068508 A1    Mar. 24, 2011

(30) Foreign Application Priority Data

Sep. 18, 2009    (JP) ................. 2009-217034

(51) Int. Cl.
*B29C 35/00*    (2006.01)
*B29D 30/26*    (2006.01)

(52) U.S. Cl.
USPC ............ 264/315; 264/325; 264/347; 264/501

(58) Field of Classification Search
None
See application file for complete search history.

(56) References Cited

U.S. PATENT DOCUMENTS

| | | |
|---|---|---|
| 4,345,052 A | 8/1982 | Mumcu et al. |
| 4,356,300 A | 10/1982 | Isler et al. |
| 4,542,466 A * | 9/1985 | Arimatsu .................. 700/199 |
| 4,910,321 A | 3/1990 | Kennedy et al. |
| 4,946,899 A | 8/1990 | Kennedy et al. |
| 5,219,948 A | 6/1993 | Storey et al. |
| 8,158,705 B2 * | 4/2012 | Sugimoto ................. 524/445 |
| 2004/0031550 A1 | 2/2004 | Kanenari et al. |
| 2008/0277815 A1 * | 11/2008 | Kaneda ...................... 264/40.6 |
| 2010/0263778 A1 | 10/2010 | Lesage et al. |
| 2011/0011511 A1 * | 1/2011 | Miyazaki et al. ........... 152/564 |
| 2011/0056604 A1 * | 3/2011 | Sugimoto ................. 152/510 |
| 2011/0056612 A1 * | 3/2011 | Sugimoto ................ 156/110.1 |

(Continued)

FOREIGN PATENT DOCUMENTS

| | | |
|---|---|---|
| EP | 0 397 081 A2 | 12/1986 |
| FR | 2918669 A1 * | 1/2009 |

(Continued)

OTHER PUBLICATIONS

Derwent abstract of JP 2007-291256 A, Nov. 8, 2007.*

(Continued)

*Primary Examiner* — Christina Johnson
*Assistant Examiner* — Benjamin Schiffman
(74) *Attorney, Agent, or Firm* — Birch, Stewart, Kolasch & Birch, LLP (57) ABSTRACT

An object of the present invention is to provide a method for producing a pneumatic tire, that does not cause an air-in phenomenon between an inner liner and an insulation or carcass by preventing adhesion of an inner liner to a bladder. The method for producing a pneumatic tire according to the present invention includes the following steps. A green tire using, as an inner liner, a polymer composition in which a polymer component contains 100 to 60% by mass of a styrene-isobutylene-styrene triblock copolymer and 0 to 40% by mass of a polyamide-based polymer that contains polyamide in the molecular chain and has a Shore D hardness of 70 or less is prepared. The green tire is mounted in a mold and vulcanized while being pressurized by a bladder. The resultant vulcanized tire is cooled at 10 to 120° C. for 10 to 300 seconds.

7 Claims, 1 Drawing Sheet

(56) References Cited

U.S. PATENT DOCUMENTS

| | | | |
|---|---|---|---|
| 2011/0060082 A1* | 3/2011 | Sugimoto | 524/262 |
| 2011/0077357 A1* | 3/2011 | Sugimoto | 525/89 |
| 2011/0315293 A1* | 12/2011 | Sugimoto | 152/450 |
| 2012/0006459 A1* | 1/2012 | Sugimoto et al. | 152/450 |
| 2012/0024447 A1* | 2/2012 | Sugimoto | 152/564 |

FOREIGN PATENT DOCUMENTS

| | | |
|---|---|---|
| JP | 55-133424 A | 10/1980 |
| JP | 56-65026 A | 6/1981 |
| JP | 62-48704 A | 3/1987 |
| JP | 63-95251 A | 4/1988 |
| JP | 64-62308 A | 3/1989 |
| JP | 3-174403 A | 7/1991 |
| JP | 6-107896 A | 4/1994 |
| JP | 9-165469 A | 6/1997 |
| JP | 10-508888 A | 9/1998 |
| JP | 2003-71844 A | 3/2003 |
| JP | 2005-225899 A | 8/2005 |
| JP | 2005-344030 A | 12/2005 |
| JP | 2007-291256 A | 11/2007 |
| JP | 2009-149711 A | 7/2009 |
| WO | WO 96/15156 A2 | 5/1996 |
| WO | WO 03/029029 A1 | 4/2003 |
| WO | WO 2009/007064 A1 | 1/2009 |
| WO | WO 2009093695 A1 * | 7/2009 |

OTHER PUBLICATIONS

Derwent abstract of WO 2009/093695 A1, Jul. 30, 2009.*

* cited by examiner

METHOD FOR PRODUCING PNEUMATIC TIRE

This nonprovisional application is based on Japanese Patent Application No. 2009-217034 filed on Sep. 18, 2009 with the Japan Patent Office, the entire contents of which are hereby incorporated by reference.

BACKGROUND OF THE INVENTION

1. Field of the Invention

The present invention relates to a method for producing a pneumatic tire.

2. Description of the Background Art

Recently, an attempt has been made to perform weight saving of tires because of strong social demands for fuel economy of automobiles. An attempt has also been made to perform weight saving of inner liners, among tire members, that are disposed inside tires and have the function of improving air permeation resistance by decreasing the amount of air leaked to the outside from the inside of pneumatic tires (air permeation amount).

In a rubber composition for an inner liner, an improvement in air permeation resistance of tires is performed by using a butyl-based rubber containing 70 to 100% by mass of a butyl rubber and 30 to 0% by mass of a natural rubber. The butyl-based rubber contains, in addition to butylene, about 1% by mass of isoprene, that enables cocrosslinking with an adjacent rubber along with sulfur, a vulcanization accelerator and zinc white. In the case of a conventional formulation, the butyl-based rubber requires the thickness of about 0.6 to 1.0 mm for tires for passenger cars, or the thickness of about 1.0 to 2.0 mm for trucks and buses.

In order to perform weight saving of tires, it is proposed to use a thermoplastic elastomer as an inner liner since it is excellent in air permeation resistance as compared with the butyl-based rubber and can further decrease the thickness of the inner liner layer. However, the thermoplastic elastomer that shows high air permeation resistance in the smaller thickness than that of the butyl-based rubber is inferior in vulcanization adhesive strength with an insulation or carcass rubber adjacent to the inner liner as compared with the butyl-based rubber. When the inner liner has low vulcanization adhesive strength, air permeates into the space between the inner liner and the insulation rubber or the carcass rubber, and thus a number of small air bubbles appear (this phenomenon is called an air-in phenomenon). Although this phenomenon does not cause deterioration of tire performance, there is a problem that a small spot pattern formed inside tires gives an impression of poor appearance to users.

Japanese Patent Laying-Open No. 09-165469 proposes a pneumatic tire capable of improving adhesion between an inner liner and a rubber composition that forms the inner surface of the tire or the carcass layer by forming an inner liner layer using nylon having low air permeability. However, in the technique of Japanese Patent Laying-Open No. 09-165469, there is a problem that a rubber cement composed of a rubber composition must be bonded after subjecting a nylon film to an RFL treatment so as to form a nylon film layer, resulting in complicated steps. Furthermore, in the vulcanization step, there is usually employed a tire vulcanization method in which a bladder body is inserted into an unvulcanized tire (green tire) accommodated in a mold and the bladder body is expanded, and then vulcanization molding is performed by pressing the tire against the inner surface of the mold from the inside of the unvulcanized tire. In the inner liner layer of Japanese Patent Laying-Open No. 09-165469, the inner liner layer composed of a nylon film layer is brought into contact with the bladder in a heated state, and therefore the inner liner layer is adhered and bonded to the bladder. Thus, there arises a problem that, when the vulcanized tire is removed from the mold, the inner liner layer bonded to the bladder is taken away to the bladder side, resulting in an air-in phenomenon between the inner liner layer and the insulation or carcass.

SUMMARY OF THE INVENTION

An object of the present invention is to provide a method for producing a pneumatic tire, that does not cause an air-in phenomenon between an inner liner and an insulation or carcass by preventing adhesion of an inner liner to a bladder.

The method for producing a pneumatic tire according to the present invention includes the following steps. A green tire using, as an inner liner, a polymer composition in which a polymer component contains 100 to 60% by mass of a styrene-isobutylene-styrene triblock copolymer and 0 to 40% by mass of a polyamide-based polymer that contains polyamide in the molecular chain and has a Shore D hardness of 70 or less is prepared. The green tire is mounted in a mold and vulcanized while being pressurized by a bladder. The resultant vulcanized tire is cooled at 10 to 120° C. for 10 to 300 seconds.

In the method for producing a pneumatic tire according to the present invention, the cooling step is preferably performed by cooling inside the bladder.

In the method for producing a pneumatic tire according to the present invention, the cooling step preferably uses, as a cooling medium, one or more kinds selected from the group consisting of air, steam, water and an oil.

In the method for producing a pneumatic tire according to the present invention, the cooling step is preferably performed by cooling the resultant vulcanized tire at 10 to 30° C. for 120 to 300 seconds.

In the method for producing a pneumatic tire according to the present invention, the polymer component preferably contains 15 to 40% by mass of an ethylene-vinyl alcohol copolymer.

In the method for producing a pneumatic tire according to the present invention, the styrene-isobutylene-styrene triblock copolymer preferably contains 10 to 30% by mass of a styrene unit.

In the method for producing a pneumatic tire according to the present invention, the polyamide-based polymer is preferably a block copolymer composed of a polyamide component and a polyether component.

According to the present invention, it is possible to provide a method for producing a pneumatic tire, that does not cause an air-in phenomenon between an inner liner and insulation or carcass by preventing adhesion of an inner liner to a bladder.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<Method for Producing Pneumatic Tire>

In one embodiment of the present invention, the method for producing a pneumatic tire includes the following steps. A green tire using, as an inner liner, a polymer composition in which a polymer component contains 100 to 60% by mass of a styrene-isobutylene-styrene triblock copolymer and 0 to 40% by mass of a polyamide-based polymer that contains polyamide in the molecular chain and has a Shore D hardness of 70 or less is prepared. The green tire is mounted in a mold and vulcanized while being pressurized by a bladder. The resultant vulcanized tire is cooled at 10 to 120° C. for 10 to 300 seconds.

<Step of Preparing Green Tire>

In the green tire prepared in one embodiment of the present invention, an inner liner is made of a polymer composition in which a polymer component contains 100 to 60% by mass of a styrene-isobutylene-styrene triblock copolymer and 0 to 40% by mass of a polyamide-based polymer that contains polyamide in the molecular chain and has a Shore D hardness of 70 or less.

(Polymer Composition)

The polymer composition contains, as a polymer component, 100 to 60% by mass of a styrene-isobutylene-styrene triblock copolymer (hereinafter may also be referred to as an SIBS) and 0 to 40% by mass of a polyamide-based polymer that contains polyamide in the molecular chain and has a Shore D hardness of 70 or less.

In one embodiment of the present invention, because of contribution of the isobutylene moiety of an SIBS, when a pneumatic tire is produced by applying the polymer composition to an inner liner, the resultant pneumatic tire has excellent air permeation resistance and durability. An SIBS has excellent durability since a molecular structure other than those of aromatic molecules is completely saturated and therefore deterioration and hardening are suppressed. Because of contribution of the polyamide moiety of the polyamide-based polymer, when a pneumatic tire is produced by applying the polymer composition to an inner liner, it becomes possible to bond the inner liner with an unsaturated polymer and thus adhesion with an adjacent rubber such as an insulation rubber or a carcass rubber is improved.

Furthermore, in the polymer composition, when a halogenated rubber having high specific gravity, which has hitherto been used so as to impart air permeation resistance, such as a halogenated butyl rubber, is not used in order to ensure air permeation resistance by the addition of the SIBS. Also when the halogenated rubber is used, it is possible to decrease the amount of use. Therefore, weight saving of the tire can be performed and the effect of improving fuel efficiency can be obtained. Furthermore, the halogenated rubber has a problem that adhesion between a ply cord and a rubber of a pneumatic tire is deteriorated due to halogens in the rubber. However, since the amount of use of the halogenated rubber can be decreased in the present invention, the effect of improving durability of the pneumatic tire due to an improvement in the adhesion between the ply cord and the polymer composition is also obtained.

(Styrene-Isobutylene-Styrene Triblock Copolymer)

In the polymer composition, the content of the SIBS in the polymer component is within a range from 100 to 60% by mass. When the content of the SIBS is 60% by mass or more, an inner liner having excellent air permeation resistance and durability can be obtained. Also, the content is preferably within a range from 95 to 80% by mass since the air permeation resistance and durability become more satisfactory.

The SIBS usually contains 10 to 40% by mass of a styrene unit. The content of the styrene unit is preferably within a range from 10 to 30% by mass since the air permeation resistance and durability become more satisfactory.

In the SIBS, a molar ratio of an isobutylene unit to a styrene unit (isobutylene unit/styrene unit) is preferably from 40/60 to 95/5 in view of the rubber elasticity of the copolymer. In the SIBS, the polymerization degree of each block is preferably from about 10,000 to 150,000 for an isobutylene block, or preferably from about 5,000 to 30,000 for a styrene block, in view of the rubber elasticity and handling (when the polymerization degree is less than 10,000, a liquid is obtained).

The SIBS can be obtained by a conventional polymerization method of a vinyl-based compound and, for example, it can be obtained by a living cationic polymerization method.

For example, Japanese Patent Laying-Open No. 62-048704 and Japanese Patent Laying-Open No. 64-062308 disclose that living cationic polymerization of isobutylene with other vinyl compounds can be performed and a polyisobutylene-based block copolymer can be produced by using isobutylene and other compounds as the vinyl compound. In addition, the method for production of a vinyl compound polymer by a living cationic polymerization method is described, for example, in U.S. Pat. No. 4,946,899, U.S. Pat. No. 5,219,948 and Japanese Patent Laying-Open No. 03-174403.

The SIBS does not have a double bond other than an aromatic double bond in the molecule and has high stability to ultraviolet rays as compared with a polymer having a double bond in the molecule, for example, polybutadiene, and therefore has satisfactory weatherability. Furthermore, although it does not have a double bond in the molecule and is a saturated rubbery polymer, a refractive index (nD) at 20° C. of light having a wavelength of 589 nm is 1.506, as described in Polymer Handbook, Willy, 1989. This is significantly higher than that of other saturated rubbery polymers, for example, an ethylene-butene copolymer.

(Polyamide-Based Polymer)

In the polymer composition, the content of the polyamide-based polymer in the polymer component is within a range from 0 to 40% by mass. When the content of the polyamide-based polymer is 40% by mass or less, in the case a pneumatic tire is produced by applying the polymer composition to an inner liner, the resultant pneumatic tire has both durability and adhesion. Since it is possible to ensure durability and adhesion and to add a larger amount of an SIBS and an ethylene-vinyl alcohol copolymer which are excellent in air permeation resistance, the content is preferably adjusted within a range from 3 to 20% by mass.

The polyamide-based polymer is a polyamide-based polymer having a Shore D hardness of 70 or less. A Shore D hardness exceeding 70 is not preferred since cracking properties upon tire flexing and transfer are deteriorated. The Shore D hardness is preferably within a range from 15 to 70, more preferably from 18 to 70, still more preferably from 20 to 70, and particularly preferably from 25 to 70.

The polyamide-based polymer preferably contains 50% by mass or more of the following polyether amide elastomer (X): A polyether amide elastomer (X) that is a block copolymer composed of a polyamide component and a polyether component, obtained by polymerizing a triblock polyether diamine compound (A) represented by the following formula (I), a polyamide-forming monomer (B) and a dicarboxylic acid compound (C):

(I)

wherein a and b represent 1 to 20, and c represents 4 to 50.

The polyamide-forming monomer (B) is preferably at least one of compounds represented by the following formulas (II) and (III):

(II)

wherein $R^1$ represents a linking group containing a hydrocarbon chain; and (III)

wherein $R^2$ represents a linking group containing a hydrocarbon chain.

The dicarboxylic acid compound (C) is preferably at least one kind of a compound selected from the group consisting of a compound represented by the following formula (IV), an aliphatic dicarboxylic acid compound and an alicyclic dicarboxylic acid compound:

(IV)

wherein $R^3$ represents a linking group containing a hydrocarbon chain, and y represents 0 or 1.

When the polyamide-based polymer is a polyamide-based polymer having a hard segment derived from a polyamide component and a soft segment derived from a polyether component, it shows low crystallinity. Therefore, it is possible to obtain a polyamide-based polymer that has a high elongation at break (EB) and shows flexibility within a temperature range from a low temperature to a high temperature.

The polyamide-based polymer can exert an excellent effect in the adhesion with an adjacent rubber since fluidity improves at the tire vulcanization temperature (140 to 180° C.) and also wettability with the uneven surface improves.

As the polyamide-based polymer, a known polyamide-based polymer can be used. As the polyamide-based polymer, for example, an elastomer constituted from a polyamide block composed of at least one kind of aliphatic nylon selected from the group consisting of nylon 6, nylon 66, nylon 11 and nylon 12, and at least one kind of a polyether block selected from the group consisting of polyoxyethylene, polyoxypropylene and polyoxybutylene can be used.

The method for producing the polyamide-based polymer is not particularly limited and methods disclosed in Japanese Patent Laying-Open No. 56-065026, Japanese Patent Laying-Open No. 55-133424 and Japanese Patent Laying-Open No. 63-095251 can be employed.

The polymer composition may contain, in addition to the SIBS and a polyamide-based polymer that contains polyamide in the molecular chain and has a Shore D hardness of 70 or less, other polymers or resins. For example, the polymer composition can contain an ethylene-vinyl alcohol copolymer, nylon, PET, a chlorobutyl rubber, a natural rubber, an ethylene-propylene-diene tercopolymer (EPDM), a styrene-butadiene rubber (SBR), a butadiene rubber, an isoprene rubber, a butyl rubber, a halogenated butyl rubber and an acrylonitrile-butadiene rubber (NBR).

(Ethylene-Vinyl Alcohol Copolymer)

The polymer component of the polymer composition preferably contains 15 to 40% by mass of an ethylene-vinyl alcohol copolymer. When the content of the ethylene-vinyl alcohol copolymer in the polymer component is 15% by mass or more, it is possible to ensure gas barrier properties of the inner liner made of the polymer composition. When the content is 40% by mass or less, it is possible to ensure the kneadability in the production of the polymer composition and to ensure basic performance such as mechanical strength in the inner liner layer of the tire. The content is more preferably adjusted to 20% by mass or more, and still more preferably 25% by mass or more. In view of durability of the tire, the content is even more preferably adjusted to 30% by mass or less.

The ethylene-vinyl alcohol copolymer is preferably represented by the following general formula (V):

(V)

wherein m and n each independently represent 1 to 100, and x represents 1 to 1,000.

Compatibility with other compounding agents in the polymer component is satisfactorily imparted by the ethylene-derived moiety of the ethylene-vinyl alcohol copolymer, and the ethylene-vinyl alcohol copolymer can exist in a fine dispersion size in the polymer component. The ethylene-vinyl alcohol copolymer has satisfactory gas barrier properties due to contribution of the vinyl alcohol-derived moiety. That is, in the present invention, when the ethylene-vinyl alcohol copolymer having excellent gas barrier properties is dispersed in the form of islands in a fine size in the polymer composition, satisfactory gas barrier properties are exhibited even when a thin inner liner layer of the tire is formed. Thus, it is possible to perform weight saving of the tire, and the effect of improving fuel efficiency is obtained.

In the general formula (V), m and n are adjusted to 1 or more so as to constitute an ethylene-vinyl alcohol copolymer. When m and n are 100 or less, it is possible to obtain an ethylene-vinyl alcohol copolymer that has both compatibility with other compounding agents in the polymer component and gas barrier properties. Since compatibility with other compounding agents in the polymer component is further improved, m is more preferably adjusted to 5 or more. Since gas barrier properties are further improved, n is more preferably adjusted to 5 or more. Since it is hard to fail to exhibit gas barrier properties due to the vinyl alcohol-derived moiety, m is more preferably adjusted to 95 or less, and still more preferably 80 or less. Since it is hard to fail to exhibit satisfactory compatibility with other compounding agents in the polymer component due to the ethylene-derived moiety, n is more preferably adjusted to 95 or less, and still more preferably 80 or less.

In the general formula (V), x is adjusted to 1 or more so as to constitute the ethylene-vinyl alcohol copolymer. When x is 1,000 or less, kneadability in the production of the polymer composition is ensured and a polymer composition containing an ethylene-vinyl alcohol copolymer dispersed uniformly therein is obtained. Since satisfactory compatibility with other compounding agents in the polymer component and gas barrier properties are exhibited, x is more preferably adjusted to 10 or more. In view of satisfactory kneadability, x is more preferably adjusted to 500 or less, and still more preferably 100 or less.

The ethylene-vinyl alcohol copolymer represented by the general formula (V) may be contained in the polymer composition in a state of being copolymerized with other components. In this case, the content of the ethylene-vinyl alcohol copolymer means the content of the structure moiety represented by the general formula (V).

The molecular structure of the ethylene-vinyl alcohol copolymer can be confirmed, for example, by an infrared absorption spectrum (IR) and a nuclear magnetic resonance spectrum (NMR).

(Compounding Agents in Polymer Composition)

In one embodiment of the present invention, an inner liner is preferably made of a polymer composition further containing a compatibilizing agent represented by the following general formula (VI):

wherein R represents an alkyl group, p and q each independently represent 1 to 100, and z represents 1 to 5. The compatibilizing agent has the effect of further enhancing, in the polymer composition, compatibility of an ethylene-vinyl alcohol copolymer and the other compounding agents in the polymer component. When p and q in the general formula (VI) each represent 1 or more, the action as the compatibilizing agent is satisfactory. When p and q each represent 100 or less, the compatibilizing agent shows satisfactory dispersibility in the polymer composition. p is more preferably 5 or more, and preferably 95 or less, and more preferably 80 or less. q is more preferably 5 or more, and preferably 95 or less, and more preferably 80 or less.

z in the general formula (VI) is adjusted to 1 or more so as to constitute a block copolymer. In view of satisfactory dispersibility of the compatibilizing agent in the polymer composition, z is preferably adjusted to 5 or less. z is more preferably 2 or more, and more preferably 4 or less.

The content of the compatibilizing agent represented by the general formula (VI) in the polymer composition is preferably adjusted within a range from 0.1 to 4.8% by mass. When the content is 0.1% by mass or more, the satisfactory effect as the compatibilizing agent is exhibited. When the content is 4.8% by mass or less, it is possible to satisfactorily prevent deterioration of basic performance such as mechanical strength in the inner liner layer of the tire. The content is preferably adjusted to 0.5% by mass or more, more preferably 1.0% by mass or more, and still more preferably 1.5% by mass or more, and preferably 4.3% by mass or less, more preferably 3.8% by mass or less, and still more preferably 3.4% by mass or less.

The compatibilizing agent represented by the general formula (VI) may be contained in the polymer composition in a state of being copolymerized with other components. In this case, the content of the compatibilizing agent means the content of the structure moiety represented by the general formula (VI).

The polymer composition can contain various compounding agents and additives, that are added to a polymer composition for tires or a conventional polymer composition, such as other reinforcing agents, vulcanization agents, vulcanization accelerators, various oils, antioxidants, softeners, plasticizers and coupling agents. The contents of these compounding agents and additives can be adjusted to appropriate amounts.

The polymer composition can be produced by a conventionally known method and examples of the method include a method in which the above materials are weighed according to a predetermined formulation and then kneaded at 100 to 250° C. for 5 to 60 minutes using a rubber kneader such as an open roll or a Banbury mixer.

<Step of Vulcanizing Green Tire>

Next, the resultant green tire is mounted in a mold and vulcanized while being pressurized by a bladder.

The mold is made of a metal. The bladder is made of a rubber. The bladder is accommodated in the mold.

In the vulcanization step, the green tire obtained in the step described above is put in an opened mold. When the green tire is put in the mold, the bladder is shrunk. As a result of putting the green tire in the mold, the bladder is located inside the green tire. The bladder is expanded by filling with a gas. The green tire is deformed by this expansion. This deformation is called shaping. Next, the mold is closed and an internal pressure of the bladder is increased. The green tire is interposed between a cavity surface of the mold and the outside surface of the bladder, and pressurized. The green tire is heated by heat conduction from the mold and the bladder. The rubber composition of the green tire flows due to application of pressure and heat. Air inside the mold transfers as a result of flow, and then is discharged from the mold. The rubber is heated to cause the vulcanization reaction, and thus a vulcanized tire is obtained.

Vulcanization is preferably performed at 150 to 180° C. for 3 to 50 minutes, for example.

<Step of Cooling Vulcanized Tire>

Next, the resultant vulcanized tire is cooled at 10 to 120° C. for 10 to 300 seconds.

In one embodiment of the present invention, an inner liner uses a polymer composition in which a polymer component contains 100 to 60% by mass of the SIBS and 0 to 40% by mass of the polyamide-based polymer. Since the polymer composition has thermoplasticity, the inner liner in contact with the outside surface of the expanded bladder is thermally fused on the bladder in the above vulcanization step. When an attempt is made to remove the vulcanized tire from the mold in a state where the inner liner is fused on the outside surface of the bladder, the inner liner is peeled from an adjacent insulation or carcass, and thus an air-in phenomenon arises. Alternatively, the tire itself may be deformed.

Therefore, in one embodiment of the present invention, the polymer composition used for the inner liner can be solidified by quenching the vulcanized tire at 120° C. or lower for 10 or more seconds. When the polymer composition is solidified, it is possible to prevent the inner liner from being fused on the bladder when removing the vulcanized tire from the mold, and thus mold releasability is improved.

The cooling temperature is from 10 to 120° C. When the cooling temperature is lower than 10° C., it is necessary to use, as a cooling medium, nitrogen in place of air. Therefore, it is not preferred in view of production. When the cooling temperature is higher than 120° C., there is a fear that the polymer composition is not sufficiently cooled and the inner liner is fused on the bladder upon opening of the mold, and thus an air-in phenomenon occurs. In view of an improvement in mold releasability, the cooling temperature is preferably from 30 to 70° C.

The cooling time is within a range from 10 to 300 seconds. When the cooling time is less than 10 seconds, there is a fear that the polymer composition is not sufficiently cooled and the inner liner is fused on the bladder upon opening of the mold, and thus an air-in phenomenon occurs. In contrast, when the cooling time is more than 300 seconds, productivity becomes poor. In view of an improvement in mold releasability, the cooling time is preferably from 120 to 300 seconds.

The step of cooling the vulcanized tire is preferably performed by cooling inside the bladder. Since a cavity exists inside the bladder, it is possible to introduce a cooling medium controlled to the cooling temperature into the bladder after completion of the vulcanization step.

It is also possible to carry out the step of cooling the vulcanized tire by cooling inside the bladder and also disposing a cooling structure in the mold.

It is preferred to use, as a cooling medium, at least one selected from air, steam, water and an oil. Of these, water having excellent cooling efficiency is preferably used.

<Structure of Pneumatic Tire>

Figure 1:
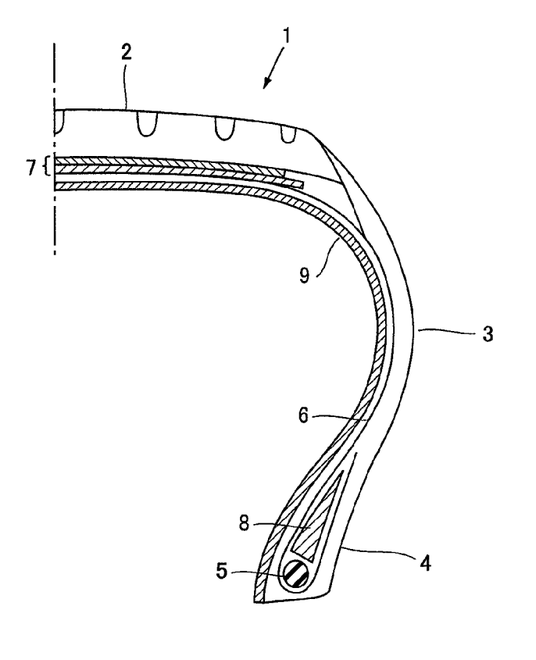
FIG. 1 is a schematic sectional view showing the right half of a pneumatic tire in one embodiment of the present invention.

A pneumatic tire produced by the method for producing a pneumatic tire according to the present invention will be described with reference to FIG. 1.

A pneumatic tire 1 can be used as tires for passenger cars, trucks and buses, and heavy duty equipment. Pneumatic tire 1 includes a tread part 2, a side wall part 3 and a bead part 4. Furthermore, a bead core 5 is embedded in bead part 4. Furthermore, provided are a carcass 6 whose ends are respectively folded around bead core 5 and latched, that is provided from one bead part 4 to the other bead part, and a belt layer 7 composed of two plies outside a crown part of carcass 6. An inner liner 9 extending from one bead part 4 to the other bead part 4 is disposed on the tire radial inner surface of carcass 6. Belt layer 7 is disposed so that cords are mutually intersected between two plies composed of a steel cord or an aramid fiber cord at an angle of usually 5 to 30° in a tire circumferential direction. Regarding the carcass, organic fiber cords made of polyester, nylon or aramid are arranged at an angle of about 90° in tire circumferential direction, and a bead apex 8 extending from the top of bead core 5 in a side wall direction is disposed in the region surrounded by the carcass and the folded part thereof.

EXAMPLES

The present invention will be described specifically by way of examples, but the present invention is not limited only thereto.

Examples 1 to 6, Comparative Examples 1 to 10

(Production of Pneumatic Tire)

According to each formulation shown in Table 2, a polymer component and a filler were charged in a twin screw extruder (screw diameter: φ50 mm, L/D: 30, cylinder temperature: 220° C.) and pelletized, and then an unvulcanized polymer composition used in Examples 1 to 6 and Comparative Examples 1 to 10 was prepared by a T die extruder (screw diameter: φ80 mm, L/D: 50, die lip width: 500 mm, cylinder temperature: 220° C., film gauge: 0.3 mm).

The resultant unvulcanized polymer composition was applied to the inner liner portion of a tire to prepare a green tire. The green tire was subjected to press molding in a mold at 170° C. for 20 minutes to obtain a vulcanized tire (195/65R15). Then, the vulcanized tire was cooled by introducing water controlled to the cooling temperature shown in Table 2 into a bladder. After a lapse of the cooling time shown in Table 2, the vulcanized tire was removed from the mold to obtain a pneumatic tire.

With respect to the resultant pneumatic tire, the following tests and evaluations were performed.

(Processability)

Processability was evaluated according to the following criteria.

A: No fusion of an inner liner material on a bladder is recognized.

B: Fusion of an inner liner material on a bladder is visually recognized.

C: Severe fusion of an inner liner material on a bladder, that may exert an adverse influence on the production, is recognized.

(Presence or Absence of Air-In Portions)

The inside of the vulcanized tire was examined. As a result, those in which the number of air-in portions with a diameter of 5 mm or less in appearance was 0 per one tire were rated "A", those in which the number of air-in portions was from 1 to 3 were rated "B", and those in which the number of air-in portions was 4 or more were rated "D". Those in which the diameter of air-in portions was more than 5 mm were rated "D" even when the number of air-in portions was 1.

(Rolling Resistance Test)

Using a rolling resistance tester manufactured by KOBE STEEL., LTD., the obtained 195/65R15 steel radial PC tire was mounted on a JIS standard rim (15×6JJ), and rolling resistance was measured while driving the tire at room temperature (38° C.) under the conditions of a load of 3.4 kN, an air pressure of 230 kPa, and a speed of 80 km/hour. Using the following calculation equation, the rolling resistance change rate (%) of each formulation was expressed by an index (the value of Comparative Example 1 was regarded as ±0). The smaller the rolling resistance change rate, the smaller the rolling resistance, and the more excellent the performance. Specifically, the rolling resistance change rate is preferably a minus value.

(Rolling resistance change rate)=(Rolling resistance of each formulation−Rolling resistance of Comparative Example 1)/(Rolling resistance of Comparative Example 1)×100

(Static Air Pressure Drop Test)

The 195/65R15 steel radial PC tire is mounted on a JIS standard rim (15×6JJ) and an initial air pressure of 300 Kpa is applied. After standing at room temperature for 90 days, a decrease rate of an air pressure is calculated.

(Evaluation Results)

The test results and overall judgment are shown in Table 2. Criteria for overall judgment are as shown in Table 1.

TABLE 1

| | Overall judgment | (a) Processability | (b) Presence or absence of air-in portions | (c) Rolling resistance change rate | (d) Static air pressure drop rate (%/month) | Judgment |
|---|---|---|---|---|---|---|
| Criteria | A | A | A | −3.6 or less | 2.7 or less | All of (a) to (d) are satisfied |
| | B | B | B | −3.5 to −0.1 | 2.8 to 3.9 | Any one of (a) to (d) is satisfied, low evaluation in the case of corresponding to plural judgments |
| | C | — | C | 0 or more | 4.0 to 6.0 | Any one of (a) to (d) is satisfied, low evaluation in the case of corresponding to plural judgments |
| | D | C | D | — | 6.1 or more | Any one of (a) to (d) is satisfied, low evaluation in the case of corresponding to plural judgments |

TABLE 2

| | | | Examples | | | | | | Comparative Examples | |
|---|---|---|---|---|---|---|---|---|---|---|
| | | | 1 | 2 | 3 | 4 | 5 | 6 | 1 | 2 |
| Compounding agent (parts by mass) | Polymer component | SIBS[Note 1] | 100 | 90 | 90 | 90 | 90 | 70 | — | 50 |
| | | Polyamide-based polymer[Note 2] | — | 10 | 10 | 10 | 10 | 10 | — | 50 |
| | | Ethylene-vinyl alcohol copolymer[Note 3] | — | — | — | — | — | 20 | — | — |
| | | Chlorobutyl[Note 4] | — | — | — | — | — | — | 80 | — |
| | | NR[Note 5] | — | — | — | — | — | — | 20 | — |
| | Filler | | — | — | — | — | — | — | 60 | — |
| Cooling conditions | Cooling temperature (° C.) | | 100 | 50 | 50 | 120 | 120 | 100 | — | 100 |
| | Cooling time (sec) | | 180 | 10 | 300 | 10 | 300 | 180 | — | 180 |
| Evaluation | Processability | | A | A | A | A | A | A | B | B |
| | Tire test | Presence or absence of air-in portions | A | A | A | A | A | A | B | D |
| | | Rolling resistance change rate | −5.0 | −4.9 | −4.4 | −5.3 | −4.6 | −3.6 | Standard (0) | −5.2 |
| | | Static air pressure drop rate (%/month) | 1.8 | 2.5 | 2.2 | 2.7 | 2.0 | 2.7 | 4.0 | 3.2 |
| | Overall judgment | | A | A | A | A | A | A | C | D |

| | | | Comparative Examples | | | | | | | |
|---|---|---|---|---|---|---|---|---|---|---|
| | | | 3 | 4 | 5 | 6 | 7 | 8 | 9 | 10 |
| Compounding agent (parts by mass) | Polymer component | SIBS[Note 1] | — | — | 90 | 90 | 90 | 90 | 90 | 70 |
| | | Polyamide-based polymer[Note 2] | 100 | — | 10 | 10 | 10 | 10 | 10 | 10 |
| | | Ethylene-vinyl alcohol copolymer[Note 3] | — | 100 | — | — | — | — | — | 20 |
| | | Chlorobutyl[Note 4] | — | — | — | — | — | — | — | — |
| | | NR[Note 5] | — | — | — | — | — | — | — | — |
| | Filler | | — | — | — | — | — | — | — | — |
| Cooling conditions | Cooling temperature (° C.) | | 100 | 100 | 50 | 50 | 120 | 120 | 130 | 130 |
| | Cooling time (sec) | | 180 | 180 | 5 | 350 | 5 | 350 | 300 | 300 |
| Evaluation | Processability | | B | B | B | C | B | C | B | B |
| | Tire test | Presence or absence of air-in portions | D | D | D | B | D | B | D | D |
| | | Rolling resistance change rate | −3.5 | −3.6 | −4.9 | −4.0 | −5.3 | −4.0 | −4.0 | −4.0 |
| | | Static air pressure drop rate (%/month) | 10.2 | 7.2 | 3.0 | 2.1 | 3.1 | 2.1 | 2.1 | 2.1 |
| | Overall judgment | | D | D | D | D | D | D | D | D |

[Note 1] SIBS: "SIBSTAR 102T" (Shore A hardness of 25, styrene unit content of 25% by mass) manufactured by Kaneka Corporation
[Note 2] Polyamide-based polymer: "UBESTA XPA 9040 (Shore D hardness of 40)" manufactured by Ube Industries, Ltd.
[Note 3] Ethylene-vinyl alcohol copolymer: "EVAL E105" manufactured by KURARAY CO., LTD.
[Note 4] Chlorobutyl: "Exxon chlorobutyl 1068" manufactured by Exxon Mobil Corporation
[Note 5] NR (natural rubber): TSR20
[Note 6] Filler: "SEAST V" (N660, $N_2SA$ of 27 $m^2/g$) manufactured by Tokai Carbon Co., Ltd.

In Example 1, in the production of a pneumatic tire using, as an inner liner, a polymer composition in which a polymer component is composed of 100% by mass of a styrene-isobutylene-styrene triblock copolymer (SIBS), the cooling temperature was adjusted to 100° C. and the cooling time was adjusted to 180 seconds in the cooling step. The resultant pneumatic tire could be easily unmolded from a bladder and was excellent in mold releasability, and thus an air-in phenomenon was prevented. Furthermore, the resultant pneumatic tire reduced rolling resistance and static air pressure drop rate.

In Examples 2 to 5, in the production of pneumatic tires using, as an inner liner, a polymer composition in which a polymer component contains 90% by mass of an SIBS and 10% by mass of a polyamide-based polymer that contains polyamide in the molecular chain and has a Shore D hardness of 70 or less, the cooling temperature was adjusted to 50° C. or 120° C. and the cooling time was adjusted to 10 seconds or 300 seconds in the cooling step. The resultant pneumatic tires could easily be unmolded from a bladder and were excellent in mold releasability, and thus an air-in phenomenon was prevented. Furthermore, the resultant pneumatic tires reduced rolling resistance and static air pressure drop rate.

In Example 6, in the production of a pneumatic tire using, as an inner liner, a polymer composition in which a polymer component contains 70% by mass of an SIBS, 10% by mass of a polyamide-based polymer and 20% by mass of an ethylene-vinyl alcohol copolymer, the cooling temperature was adjusted to 100° C. and the cooling time was adjusted to 180 seconds in the cooling step. The resultant pneumatic tire could easily be unmolded from a bladder and was excellent in mold releasability, and thus an air-in phenomenon was prevented. Furthermore, the resultant pneumatic tire reduced rolling resistance and static air pressure drop rate.

In Comparative Example 1, a pneumatic tire was produced by using, as an inner liner, a conventional rubber composition for an inner liner in which a polymer component is composed of 80% by mass of chlorobutyl and 20% by mass of a natural rubber. In the production process, the cooling step was not provided. The resultant pneumatic tire was inferior in rolling resistance and resistance to static air pressure drop as compared with those of examples.

In Comparative Example 2, in the production of a pneumatic tire using, as an inner liner, a polymer composition in which a polymer component contains 50% by mass of an SIBS and 50% by mass of a polyamide-based polymer, the cooling temperature was adjusted to 100° C. and the cooling time was adjusted to 180 seconds in the cooling step. In the resultant pneumatic tire, an air-in phenomenon occurred.

In Comparative Example 3, in the production of a pneumatic tire using, as an inner liner, a polymer composition in which a polymer component contains 100% by mass of a polyamide-based polymer, the cooling temperature was adjusted to 100° C. and the cooling time was adjusted to 180 seconds in the cooling step. In the resultant pneumatic tire, an air-in phenomenon occurred. Furthermore, the resultant pneumatic tire was inferior in resistance to static air pressure drop.

In Comparative Example 4, in the production of a pneumatic tire using, as an inner liner, a polymer composition in which a polymer component is composed of 100% by mass of an ethylene-vinyl alcohol copolymer, the cooling temperature was adjusted to 100° C. and the cooling time was adjusted to 180 seconds in the cooling step. In the resultant pneumatic tire, an air-in phenomenon occurred. Furthermore, the resultant pneumatic tire was inferior in resistance to static air pressure drop.

In Comparative Examples 5 to 8, in the production of pneumatic tires using, as an inner liner, a polymer composition in which a polymer component contains 90% by mass of an SIBS and 10% by mass of a polyamide-based polymer, the cooling temperature was adjusted to 50° C. or 120° C. and the cooling time was adjusted to 5 seconds or 350 seconds in the cooling step. In the resultant pneumatic tires, an air-in phenomenon occurred. Furthermore, the resultant pneumatic tires were inferior in processability.

In Comparative Example 9, in the production of a pneumatic tire using, as an inner liner, a polymer composition in which a polymer component contains 90% by mass of an SIBS and 10% by mass of a polyamide-based polymer, the cooling temperature was adjusted to 130° C. and the cooling time was adjusted to 300 seconds in the cooling step. In the resultant pneumatic tire, an air-in phenomenon occurred.

In Comparative Example 10, in the production of a pneumatic tire using, as an inner liner, a polymer composition in which a polymer component contains 70% by mass of an SIBS, 10% by mass of a polyamide-based polymer that contains polyamide in the molecular chain and has a Shore D hardness of 70 or less and 20% by mass of an ethylene-vinyl alcohol copolymer, the cooling temperature was adjusted to 130° C. and the cooling time was adjusted to 300 seconds in the cooling step. In the resultant pneumatic tire, an air-in phenomenon occurred.

Examples 7 to 12, Comparative Examples 11 to 14

(Production of Vulcanized Polymer Sheet)

According to each formulation shown in Table 4, a polymer component and a filler were charged in a twin screw extruder (screw diameter: $\phi$50 mm, length: 1 m, cylinder temperature: 220° C.) and pelletized, and then an unvulcanized polymer sheet was produced by a T die extruder (screw diameter: $\phi$80 mm, controlled temperature: 220° C., film gauge: 0.6 mm).

The resultant unvulcanized polymer sheet was heated at 170° C. for 12 minutes to produce a vulcanized polymer sheet. With respect to the vulcanized polymer sheet, an air permeability test was performed.

(Air Permeability Test)

In accordance with ASTM D 1434 75M, the air permeation amount ($\times 10^{11}$ cm$^3$·cm/cm$^2$·s·cm·Hg) of a vulcanized polymer sheet was measured. The smaller the air permeation amount, more excellent the air barrier properties.

(Production of Pneumatic Tire)

The resultant unvulcanized polymer sheet was applied to the inner liner portion of a tire to prepare a green tire. The green tire was subjected to press molding in a mold at 170° C. for 20 minutes to obtain a vulcanized tire (195/65R15). Then, the vulcanized tire was cooled by introducing water at a temperature of 10° C. into a bladder. After a lapse of the cooling time shown in Table 4, the vulcanized tire was removed from the mold to obtain a pneumatic tire.

With respect to the resultant pneumatic tire, the following tests and evaluations were performed.

(Presence or Absence of Air-In Portions)

The inside of the vulcanized tire was examined. As a result, those in which the number of air-in portions with a diameter of 10 min or less in appearance was 3 or less per one tire was rated "A", those in which the number of air-in portions was from 4 to 9 were rated "B", and those in which the number of air-in portions was 10 or more were rated "D". Those in which the diameter of air-in portions is more than 10 mm were rated "D" even when the number of air-in portions was 1.

(Rolling Resistance Test)

In the same manner as in Example 1, the rolling resistance was measured and the rolling resistance change rate (%) was expressed by an index (the value of Comparative Example 12 is regarded as ±0). The smaller the rolling resistance change rate, the smaller the rolling resistance, and the more excellent the performance. Specifically, the rolling resistance change rate is preferably a minus value.

(Static Air Pressure Drop Test)

In the same manner as in Example 1, the static air pressure drop rate was calculated.

(Evaluation Results)

The test results and overall judgment are shown in Table 4.
Criteria for overall judgment are as shown in Table 3.

In Example 8, in the production of a pneumatic tire using, as an inner liner, a polymer composition in which a polymer component contains 70% by mass of an SIBS, 10% by mass of a polyamide-based polymer and 20% by mass of an ethylene-vinyl alcohol copolymer, the cooling temperature was adjusted to 10° C. and the cooling time was adjusted to 120 seconds in the cooling step. The resultant pneumatic tire could easily be unmolded from a bladder and was excellent in mold releasability, and thus an air-in phenomenon was prevented. Furthermore, the resultant pneumatic tire reduced rolling resistance and static air pressure drop rate.

In Example 9, in the production of a pneumatic tire using, as an inner liner, a polymer composition in which a polymer component is composed of 100% by mass of an SIBS, the

TABLE 3

| | Overall judgment | (a) Air permeation amount ($\times 10^{11}$ cm$^3 \cdot$ cm/ cm$^2 \cdot$ s $\cdot$ cm $\cdot$ Hg) | (b) Presence or absence of air-in portions | (c) Rolling resistance change rate | (d) Static air pressure drop rate (%/month) | Judgment |
|---|---|---|---|---|---|---|
| Criteria | A | 4.5 or less | A | −3.6 or less | 2.7 or less | All of (a) to (d) are satisfied |
| | B | 4.6 to 10.0 | B | −3.5 to −0.1 | 2.8 to 3.9 | Any one of (a) to (d) is satisfied, low evaluation in the case of corresponding to plural judgments |
| | C | 10.1 to 15.0 | C | 0 or more | 4.0 to 6.0 | Any one of (a) to (d) is satisfied, low evaluation in the case of corresponding to plural judgments |
| | D | 15.1 or more | D | — | 6.1 or more | Any one of (a) to (d) is satisfied, low evaluation in the case of corresponding to plural judgments |

TABLE 4

| | | | Examples | | | | | | Comparative Examples | | | |
|---|---|---|---|---|---|---|---|---|---|---|---|---|
| | | | 7 | 8 | 9 | 10 | 11 | 12 | 11 | 12 | 13 | 14 |
| Compounding agent (parts by mass) | Polymer component | SIBS[Note 1] | 90 | 70 | 100 | 90 | 70 | 100 | — | 50 | — | — |
| | | Polyamide-based polymer[Note 2] | 10 | 10 | — | 10 | 10 | — | — | 50 | 100 | — |
| | | Ethylene-vinyl alcohol copolymer[Note 3] | — | 20 | — | — | 20 | — | — | — | — | 100 |
| | | Chlorobutyl[Note 4] | — | — | — | — | — | — | 80 | — | — | — |
| | | NR[Note 5] | — | — | — | — | — | — | 20 | — | — | — |
| | Filler | | — | — | — | — | — | — | 60 | — | — | — |
| Cooling conditions | | Cooling temperature (° C.) | 10 | 10 | 10 | 10 | 10 | 10 | 10 | 10 | 10 | 10 |
| | | Cooling time (sec) | 120 | 120 | 120 | 60 | 60 | 60 | 60 | 60 | 60 | 60 |
| Evaluation | Vulcanized polymer sheet | Air permeation amount ($\times 10^{11}$ cm$^3 \cdot$ cm/ cm$^2 \cdot$ s $\cdot$ cm $\cdot$ Hg) | 4 | 7.2 | 3.4 | 3.6 | 3.9 | 3.5 | 12.2 | 8.2 | 25 | 10.2 |
| | Tire test | Presence or absence of air-in portions | A | A | A | A | A | B | B | D | D | D |
| | | Rolling resistance change rate | −5.2 | −3.9 | −4.9 | −4.1 | −3.5 | −5 | Standard (0) | −5.2 | −3.5 | −3.6 |
| | | Static air pressure drop rate (%/month) | 2 | 3 | 2.7 | 2.9 | 2.8 | 1.8 | 4 | 3.2 | 10.2 | 7.2 |
| | Overall judgment | | A | B | A | B | B | B | C | D | D | D |

[Note 1] SIBS: "SIBSTAR 102T" (Shore A hardness of 25, styrene unit content of 25% by mass) manufactured by Kaneka Corporation
[Note 2] Polyamide-based polymer: "UBESTA XPA 9040 (Shore D hardness of 40)" manufactured by Ube Industries, Ltd.
[Note 3] Ethylene-vinyl alcohol copolymer: "EVAL E105" manufactured by KURARAY CO., LTD.
[Note 4] Chlorobutyl: "Exxon chlorobutyl 1068" manufactured by Exxon Mobil Corporation
[Note 5] NR (natural rubber): TSR20
[Note 6] Filler: "SEAST V" (N660, N$_2$SA of 27 m$^2$/g) manufactured by Tokai Carbon Co., Ltd.

In Example 7, in the production of a pneumatic tire using, as an inner liner, a polymer composition in which a polymer component contains 90% by mass of an SIBS and 10% by mass of a polyamide-based polymer, the cooling temperature was adjusted to 10° C. and the cooling time was adjusted to 120 seconds in the cooling step. The resultant pneumatic tire could easily be unmolded from a bladder and was excellent in mold releasability, and thus an air-in phenomenon was prevented. Furthermore, the resultant pneumatic tire reduced rolling resistance and static air pressure drop rate.

cooling temperature was adjusted to 10° C. and the cooling time was adjusted to 120 seconds in the cooling step. The resultant pneumatic tire could easily be unmolded from a bladder and was excellent in mold releasability, and thus an air-in phenomenon was prevented. Furthermore, the resultant pneumatic tire reduced rolling resistance and static air pressure drop rate.

In Example 10, in the production of a pneumatic tire using, as an inner liner, a polymer composition in which a polymer component contains 90% by mass of an SIBS and 10% by mass of a polyamide-based polymer, the cooling temperature was adjusted to 10° C. and the cooling time was adjusted to 60 seconds in the cooling step. The resultant pneumatic tire could easily be unmolded from a bladder and was excellent in mold releasability, and thus an air-in phenomenon was prevented. Furthermore, the resultant pneumatic tire reduced rolling resistance and static air pressure drop rate.

In Example 11, in the production of a pneumatic tire using, as an inner liner, a polymer composition in which a polymer component contains 70% by mass of an SIBS, 10% by mass of a polyamide-based polymer and 20% by mass of an ethylene-vinyl alcohol copolymer, the cooling temperature was adjusted to 10° C. and the cooling time was adjusted to 60 seconds in the cooling step. The resultant pneumatic tire could easily be unmolded from a bladder and was excellent in mold releasability, and thus an air-in phenomenon was prevented. Furthermore, the resultant pneumatic tire reduced rolling resistance and static air pressure drop rate.

In Example 12, in the production of a pneumatic tire using, as an inner liner, a polymer composition in which a polymer component is composed of 100% by mass of an SIBS, the cooling temperature was adjusted to 10° C. and the cooling time was adjusted to 60 seconds in the cooling step. The resultant pneumatic tire could easily be unmolded from a bladder and was excellent in mold releasability, and thus an air-in phenomenon was prevented. Furthermore, the resultant pneumatic tire reduced rolling resistance and static air pressure drop rate.

In Comparative Example 11, a pneumatic tire was produced by using, as an inner liner, a conventional rubber composition for an inner liner in which a polymer component is composed of 80% by mass of chlorobutyl and 20% by mass of a natural rubber, the cooling temperature was adjusted to 10° C. and the cooling time was adjusted to 60 seconds in the cooling step. In the resultant pneumatic tire, an air-in phenomenon occurred. Furthermore, the resultant pneumatic tire was inferior in rolling resistance and resistance to static air pressure drop as compared with those of examples.

In Comparative Example 12, in the production of a pneumatic tire using, as an inner liner, a polymer composition in which a polymer component contains 50% by mass of an SIBS and 50% by mass of a polyamide-based polymer, the cooling temperature was adjusted to 10° C. and the cooling time was adjusted to 60 seconds in the cooling step. In the resultant pneumatic tire, an air-in phenomenon occurred. Furthermore, the resultant pneumatic tire was inferior in rolling resistance and resistance to static air pressure drop as compared with those of examples. Also, the vulcanized polymer sheet was inferior in air permeation resistance.

In Comparative Example 13, in the production of a pneumatic tire using, as an inner liner, a polymer composition in which a polymer component contains 100% by mass of a polyamide-based polymer, the cooling temperature was adjusted to 10° C. and the cooling time was adjusted to 60 seconds in the cooling step. In the resultant pneumatic tire, an air-in phenomenon occurred. Furthermore, the resultant pneumatic tire was inferior in rolling resistance and resistance to static air pressure drop as compared with those of examples. Also, the vulcanized polymer sheet was inferior in air permeation resistance.

In Comparative Example 14, in the production of a pneumatic tire using, as an inner liner, a polymer composition in which a polymer component is composed of 100% by mass of an ethylene-vinyl alcohol copolymer, the cooling temperature was adjusted to 10° C. and the cooling time was adjusted to 60 seconds in the cooling step. In the resultant pneumatic tire, an air-in phenomenon occurred. Furthermore, the resultant pneumatic tire was inferior in rolling resistance and resistance to static air pressure drop as compared with those of examples. Also, the vulcanized polymer sheet was inferior in air permeation resistance.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method for producing a pneumatic tire, said method comprising the steps of:
   preparing a green tire using, as an inner liner, a polymer composition consisting essentially of a polymer component containing 95 to 80% by mass of a styrene-isobutylene-styrene triblock copolymer and 3 to 20% by mass of a polyamide-based polymer containing polyamide in the molecular chain and having a Shore D hardness of 70 or less;
   mounting the green tire in a mold and vulcanizing the green tire while being pressurized by a bladder; and
   cooling the resultant vulcanized tire at 10 to 120° C. for 10 to 300 seconds.

2. The method for producing a pneumatic tire according to claim 1, wherein the cooling step is performed by cooling inside the bladder.

3. The method for producing a pneumatic tire according to claim 1, wherein the cooling step uses, as a cooling medium, at least one kind selected from the group consisting of air, steam, water and an oil.

4. The method for producing a pneumatic tire according to claim 1, wherein the cooling step is performed by cooling the resultant vulcanized tire at 10 to 30° C. for 120 to 300 seconds.

5. The method for producing a pneumatic tire according to claim 1, wherein the polymer component contains 15 to 40% by mass of an ethylene-vinyl alcohol copolymer.

6. The method for producing a pneumatic tire according to claim 1, wherein the styrene-isobutylene-styrene triblock copolymer contains 10 to 30% by mass of a styrene unit.

7. The method for producing a pneumatic tire according to claim 1, wherein the polyamide-based polymer is a block copolymer composed of a polyamide component and a polyether component.

* * * * *